(12) United States Patent
Claussen et al.

(10) Patent No.: US 6,868,719 B1
(45) Date of Patent: Mar. 22, 2005

(54) TIRE PRESSURE MONITORING METHOD

(75) Inventors: Stephen P. Claussen, Richland, MI (US); Daryl J. Stacer, Portage, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/004,719

(22) Filed: Dec. 4, 2001

(51) Int. Cl.$^7$ .............................................. B60C 23/02
(52) U.S. Cl. ...................................................... 73/146.2
(58) Field of Search .............................. 73/146, 146.2, 73/146.5, 146.8; 340/442–448; 152/415, 419

(56) References Cited

U.S. PATENT DOCUMENTS

| | | | |
|---|---|---|---|
| 2,695,122 A | 11/1954 | Learman | 220/20.6 |
| 4,441,539 A | 4/1984 | Hulse | 152/417 |
| 4,506,708 A | 3/1985 | Onuma | 141/4 |
| 4,619,303 A | 10/1986 | Bryan et al. | 152/416 |
| 4,640,331 A | 2/1987 | Braun et al. | 152/417 |
| 4,678,017 A | 7/1987 | Schultz | 152/416 |
| 4,708,184 A | 11/1987 | Pechar | 152/417 |
| 4,724,879 A | 2/1988 | Schultz et al. | 152/416 |
| 4,744,399 A | 5/1988 | Magnuson et al. | 152/417 |
| 4,754,792 A | 7/1988 | Braun et al. | 152/417 |
| 4,763,709 A | 8/1988 | Scholer | 152/416 |
| 4,782,878 A | 11/1988 | Mittal | 152/417 |
| 4,782,879 A | 11/1988 | Le Chatelier et al. | 152/417 |
| 4,825,925 A | 5/1989 | Schultz | 152/415 |
| 4,860,579 A | 8/1989 | Beverly | 73/146.2 |
| 4,875,509 A | 10/1989 | Da Silva | 141/38 |
| 4,883,105 A | 11/1989 | Schultz | 152/416 |
| 4,883,106 A | 11/1989 | Schultz et al. | 152/417 |
| 4,893,664 A | 1/1990 | Oltean | 152/416 |
| 4,898,216 A | 2/1990 | Schultz et al. | 141/4 |
| 4,905,742 A | 3/1990 | Mohs | 141/38 |
| 4,917,163 A | 4/1990 | Schultz | 152/415 |
| 4,922,946 A | 5/1990 | Boulicault | 137/102 |
| 4,924,926 A | 5/1990 | Schultz et al. | 152/417 |
| 5,121,774 A | 6/1992 | Hicks et al. | 141/4 |
| 5,174,839 A | 12/1992 | Schultz et al. | 152/415 |
| 5,179,981 A | 1/1993 | Hicks et al. | 141/4 |
| 5,180,456 A | 1/1993 | Schultz et al. | 152/416 |
| 5,253,687 A | 10/1993 | Beverly et al. | 152/416 |
| 5,273,064 A | 12/1993 | Beverly et al. | 137/102 |
| 5,291,776 A | 3/1994 | Mallison | 73/146 |
| 5,309,969 A | 5/1994 | Mittal | 152/415 |
| 5,313,995 A | 5/1994 | Schultz | 152/416 |
| 5,409,045 A | 4/1995 | Walker et al. | 141/4 |
| 5,505,080 A | 4/1996 | McGhee | 73/146.5 |
| 5,516,379 A | 5/1996 | Schultz | 152/415 |
| 5,540,268 A | 7/1996 | Mittal | 152/415 |
| 5,553,647 A | 9/1996 | Jaksic | 152/415 |
| 5,600,301 A | 2/1997 | Robinson, III | 340/442 |
| 5,611,875 A | 3/1997 | Bachhuber | 152/415 |
| 5,629,873 A | 5/1997 | Mittal et al. | 364/558 |
| 5,629,874 A | 5/1997 | Mittal | 364/558 |
| 5,674,332 A | 10/1997 | Battocchio | 152/416 |
| 5,838,229 A | 11/1998 | Robinson, III | 340/442 |
| 6,067,850 A | 5/2000 | Lang et al. | 73/146.8 |
| 6,098,682 A | 8/2000 | Kis | 152/415 |
| 6,246,317 B1 | 6/2001 | Pickornik et al. | 340/447 |
| 6,250,327 B1 | 6/2001 | Freigang et al. | 137/225 |
| 6,283,186 B1 | 9/2001 | Krisher | 152/417 |
| 6,293,147 B1 | 9/2001 | Parker et al. | 73/462 |

OTHER PUBLICATIONS

"Tire Maintenance Syustem Installation and Troubleshooting," Dana Corporation, Jul. 2001.

*Primary Examiner*—William Oen
(74) *Attorney, Agent, or Firm*—Dykema Gossett PLLC

(57) ABSTRACT

A method of monitoring the fluid pressure of, with a sensor of a tire pressure management system disposed without, a tire that prevents overinflation of same. The method of monitoring a fluid pressure of a tire with a sensor, disposed in conduit assemblies for conducting fluid to or from the tire, of a tire pressure management system includes providing a pulse of compressed fluid to the conduit assemblies, unless a counter exceeds a count, the fluid in the conduit assemblies thereafter having a conduit pressure. The pulse has a duration that corresponds to a ratio defined by a first predetermined amount divided by a second predetermined amount.

14 Claims, 3 Drawing Sheets

TIRE PRESSURE MONITORING METHOD

BACKGROUND OF THE INVENTION

Conventional tire pressure management systems typically have central tire inflation systems (CTI systems), also known as on-board inflation systems and traction systems. These tire pressure management systems are well known, as may be seen by reference to the following U.S. Pat. Nos. 5,516,379; 5,313,995; 5,273,064; 5,253,687; 5,180,456; 5,179,981; 5,174,839; 5,121,774; 4,924,926; 4,922,946; 4,917,163; 4,893,664; 4,883,106; 4,883,105; 4,825,925; 4,782,879; 4,754,792; 4,724,879; 4,678,017; 4,640,331; and 4,619,303. The entire disclosure of each of these patents is incorporated herein.

Generally, tire pressure management systems employ a pneumatically controlled wheel valve that is affixed to each vehicle wheel assembly for controlling tire pressure in response to pressure signals from a fluid control circuit. The fluid control circuit is connected to each wheel valve via a rotary seal assembly associated with each wheel valve. Tire pressure may be monitored with of a sensor disposed in a conduit assembly in the fluid control circuit. When the wheel valve and certain control valves are opened, the pressure in the conduit assembly equalizes to tire pressure which can be sensed by the sensor. An electronic control unit receives electrical pressure signals generated by the sensor and appropriately controls the fluid control circuit in response thereto for inflating or deflating a selected tire.

A tire inflation management system that monitors tire pressure with a central sensor typically will add a small amount of fluid to a tire so monitored because fluid in the conduits must have a pressure that exceeds the pressure of fluid in the tire to overcome the bias of the normally-closed wheel valve and initiate fluid communication among the tire and conduit assemblies. Because tire inflation management systems typically cycle through pressure monitoring routines regularly, for example every ten minutes, the small amounts of fluid input into a tire eventually can increase the overall pressure beyond a target pressure of, or overinflate, the tire. Tire overinflation can cause undesirable uneven and/or rapid wear. Thus, what is needed is a method of monitoring the fluid pressure of, with a sensor of a tire pressure management system disposed without, a tire that prevents overinflation of same.

SUMMARY OF THE INVENTION

The invention provides a method of monitoring the fluid pressure of, with a sensor of a tire pressure management system disposed without, a tire that prevents overinflation of same. The method of monitoring a fluid pressure of a tire with a sensor, disposed in conduit assemblies for conducting fluid to or from the tire, of a tire pressure management system includes providing a pulse of compressed fluid to the conduit assemblies, unless a counter exceeds a count, the fluid in the conduit assemblies thereafter having a conduit pressure. The pulse has a duration that corresponds to a ratio defined by a first predetermined amount divided by a second predetermined amount.

The invention provides improved elements and arrangements thereof, for the purposes described, which are inexpensive, dependable and effective in accomplishing intended purposes of the invention. Other features and advantages of the present invention will become apparent from the following description of the preferred embodiments, which refers to the accompanying drawings.

BRIEF DESCRIPTION OF THE DRAWINGS

The invention is described in detail below with reference to the following figures, throughout which similar reference characters denote corresponding features consistently, wherein.

DETAILED DESCRIPTION OF THE PREFERRED EMBODIMENT

The invention is a method of monitoring the fluid pressure of, with a sensor of a tire pressure management system disposed without, a tire that prevents overinflation of same. The method may be achieved with known tire pressure management systems, such as the exemplary tire pressure management system described below.

Figure 1:
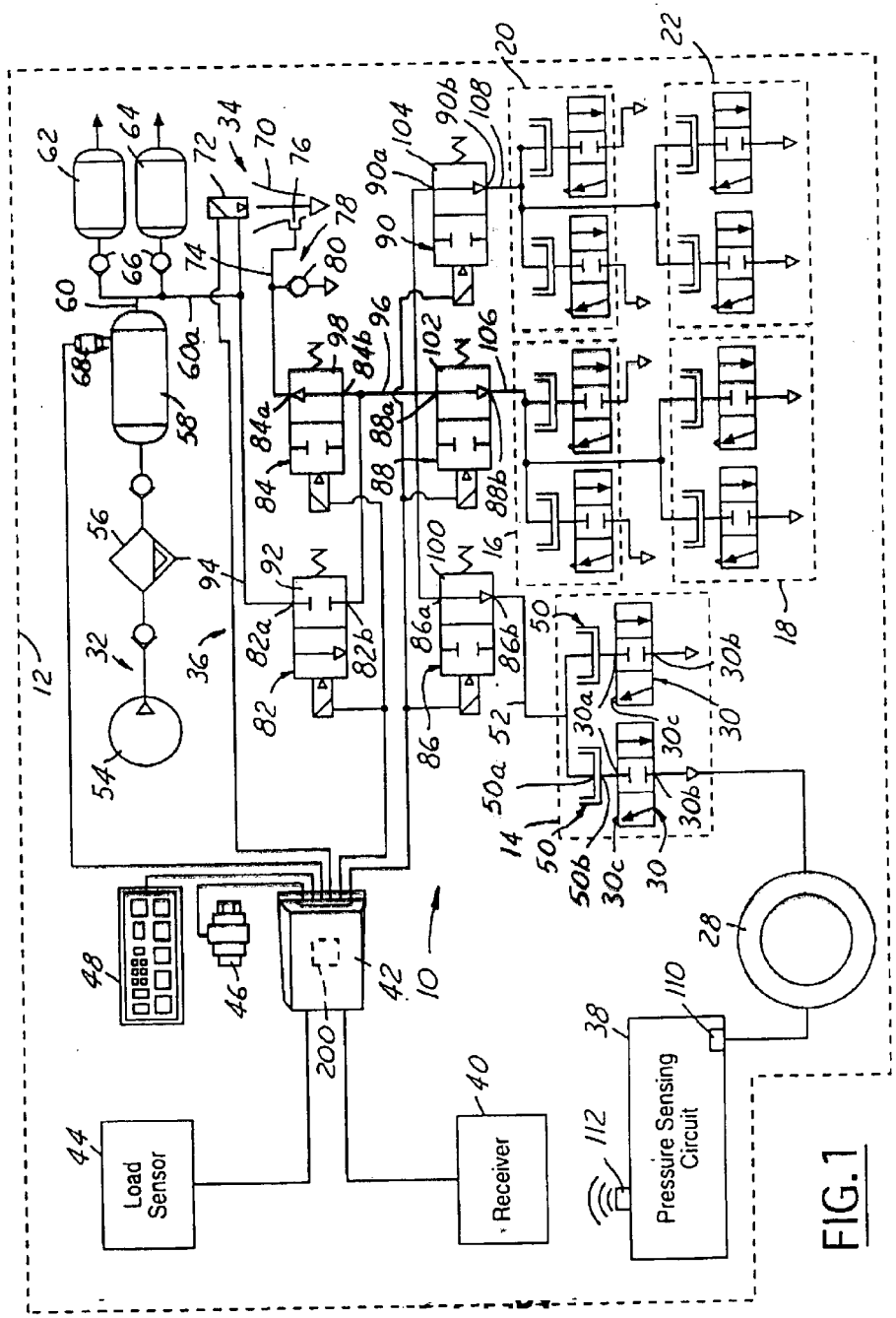
FIG. 1 is a diagrammatic view of a tire pressure management system for a vehicle, a vehicle incorporating same being shown in dotted line.

FIG. 1 shows a tire pressure management system 10 for a vehicle 12 for describing, but not limiting applicability of the invention. Vehicle 12 may be, but is not limited to being a tractor-trailer. The system may be used in connection with a wide variety of vehicles, including automobiles.

Figure 2:
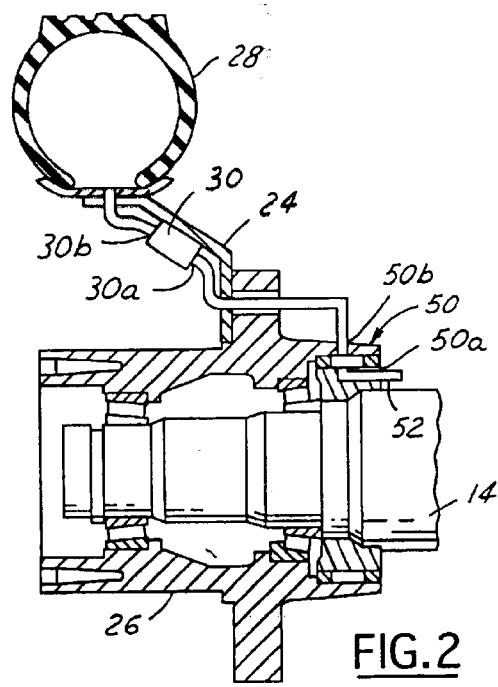
FIG. 2 is a cross-sectional detail view of a conventional vehicle wheel assembly.

Vehicle 12 may include a plurality of axles, including a steer axle 14, a tandem axle assembly having drive axles 16, 18 and another tandem axle assembly having trailer axles 20, 22. As shown in greater detail in FIG. 2, each axle, such as drive axle 14, may include wheels 24 affixed to wheel hubs 26 disposed at each outboard end of the axle and rotationally supported on axle 14. Each wheel 24 may include one or more inflatable tires 28 mounted thereon.

System 10 monitors and controls pressure within each tire 28 of vehicle 12. System 10 may include wheel valve assemblies 30, a fluid source 32, a vacuum source 34, and a fluid control circuit 36. System 10 may further include at least a sensor 200, one or more electronic control units 42, one or more load sensors 44, a speed sensor 46, and an operator control device 48.

Wheel valve assemblies 30 are provided to control the flow of pressurized fluid into and out of tires 28. Valve assembly 30 is mounted to each end of each axle and is connected to the remainder of system 10 through a rotary seal connection 50. Wheel valve assembly 30 is conventional and may include the wheel valve assembly described and illustrated in U.S. Pat. No. 5,253,687 or U.S. Pat. No. 6,250,327, the entire disclosures of which are incorporated herein.

Rotary seal assembly 50 also is conventional and may include the rotary seal assembly described and illustrated in U.S. Pat. No. 5,174,839, the entire disclosure of which also is incorporated herein.

Referring again to FIG. 2, wheel valve assembly 30 may include an inlet port 30a coupled to a rotatable port 50b of rotary seal assembly 50, an outlet port 30b in fluid communication with the interior of tire 28, and an exhaust port 30c, best shown in FIG. 1. Rotary seal assembly 50 may further include a non-rotatable port 50a connected to a conduit 52 of fluid control circuit 36. Valve assembly 30 assumes a closed position, as illustrated in FIG. 1, when the fluid pressure at inlet port 30*a* is substantially atmospheric, an open position connecting inlet port 30*a* and outlet port 30*b* when the fluid pressure at inlet port 30*a* is a positive pressure, and an exhaust position connecting outlet port 30*b* and exhaust port 30*c* when the fluid pressure at inlet port 30*a* is a negative pressure.

Fluid source 32 provides positive pressurized fluid to system 10 and tires 28. Fluid source 32 is conventional and may include a pressure source, such as a pump 54, an air dryer 56, and a first fluid tank 58 connected via a conduit 60 to the brake system fluid tanks 62, 64 and to the fluid control circuit 36 via a branch conduit 60*a*. Check valves 66 prevent sudden loss of fluid pressure in brake tanks 62, 64 in the event of upstream pressure loss. A pressure sensor 68 monitors pressure within tank 58 and provides a pressure indicative signal to electronic control unit 42.

Vacuum source 34 produces a negative pressure in system 10 to decrease fluid pressure in tires 28 of vehicle 12. Vacuum source 34 also is conventional and may include a vacuum generator 70 controlled through a solenoid valve 72. A low pressure zone is produced by passing fluid through a venturi like portion of vacuum generator 70. Upon urging solenoid valve 72 into an open position via a control signal from electronic control unit 42, a vacuum or negative fluid pressure, relative to atmospheric pressure, is introduced in a conduit 74, which has a small orifice 76 disposed proximate the low pressure zone produced by generator 70. Conduit 74 also is connected to a one-way vent valve 78 for rapid venting of positive fluid pressure from conduit 74. Vent valve 78 includes a valving member 80 that is drawn into a closed position in response to negative fluid pressure in conduit 74 and is urged into an open position in response to positive pressure fluid in conduit 74.

Fluid control circuit 36 directs the flow of pressurized fluid within system 10 for controlling pressure in tires 28 of vehicle 12. Control circuit 36 may include a pair of pressure control valves 82, 84 and a plurality of axle distribution valves 86, 88, 90. As shown, a single fluid control circuit 36 controls pressure in all of the tires 28 of vehicle 12. However, control circuit 36, and other portions of system 10, may be replicated so that, for example, one control circuit 36 may control tire pressures in the tractor portion of vehicle 12 and another control circuit 36 may control tire pressure in the trailer portion of vehicle 12.

Pressure control valve 82 directs positive pressurized fluid from fluid source 32 to tires 28 of vehicle 12. Valve 82 may include a conventional two position-two way, solenoid a controlled and pilot fluid operated valve. Valve 82 includes a valving member 92 that is spring biased toward a closed position, as shown in FIG. 1. Valving member 92 assumes an open position in response to energizing of a solenoid operatively associated therewith via control signals from electronic control unit 42. Valve 82 has a first port 82*a* coupled to a conduit 94 leading to fluid source 32. Valve 82 has a second port 82*b* coupled to another conduit 96 leading to axle distribution valves 86, 88, 90.

Pressure control valve 84 vents control circuit 36. Valve 84 is conventional and may also include a two position-two way, solenoid controlled and pilot fluid operated valve. Valve 84 includes a valving member 98 that is spring biased toward an open position, as shown in FIG. 1. Valving member 98 assumes a closed position in response to energizing a solenoid operatively associated therewith via control signals from electronic control unit 42. Valve 84 has a first port 84*a* coupled to conduit 74 leading to orifice 76. Valve 84 has a second port 84*b* coupled to conduit 96 leading to axle distribution valves 86, 88, 90.

Axle distribution valves 86, 88, 90 limit the supply of positive pressurized fluid to, or the release of fluid from, the tires 28 of one or more axles 14, 16, 18, 20, 22 of vehicle 12. Valves 86, 88, 90 are conventional and may include two position-two way, solenoid controlled and pilot fluid operated valves. Valves 86, 88, 90 direct the flow of fluid to and from the tires 28 of axles 14, 16 and 18, and 20 and 22, respectively. Each of valves 86, 88, 90 includes a valving member 100, 102, 104, respectively, that is spring-biased toward an open position, as shown in FIG. 1, and which assumes a closed position in response to energizing a solenoid operatively associated therewith via electrical signals from electronic control unit 42. Each of valves 86, 88, 90 respectively has first ports 86*a*, 88*a*, 90*a* coupled to conduit 96. Each of valves 86, 88, 90 respectively has second ports 86*b*, 88*b*, 90*b* leading to respective corresponding conduits 52, 106, 108 for each axle or tandem axle of vehicle 12.

Although axle distribution valves 86, 88, 90 are shown, individual tire distribution valves could be used in conjunction with axle distribution valves 86, 88, 90 or as an alternative to axle distribution valves 86, 88, 90 to further control the flow of fluid to and from individual tires 28 of vehicle 12. Further, although only three axle distribution valves 86, 88, 90 are shown, the number of axle distribution valves may be varied depending upon the number of axles of vehicle 12 and to allow for greater individual control of the tires 28 of vehicle 12.

Sensor 200 may be electrically integrated with electronic control unit 42. Sensor 200 is disposed in fluid communication with conduit assemblies for conducting fluid to and/or from tires 28. Sensor 200 may transmit a parameter signal indicative of a measured parameter associated with a corresponding tire 28 of vehicle 12. The parameter may correspond to fluid pressure or another value, such as temperature, that may be indicative of pressure.

Figure 3:
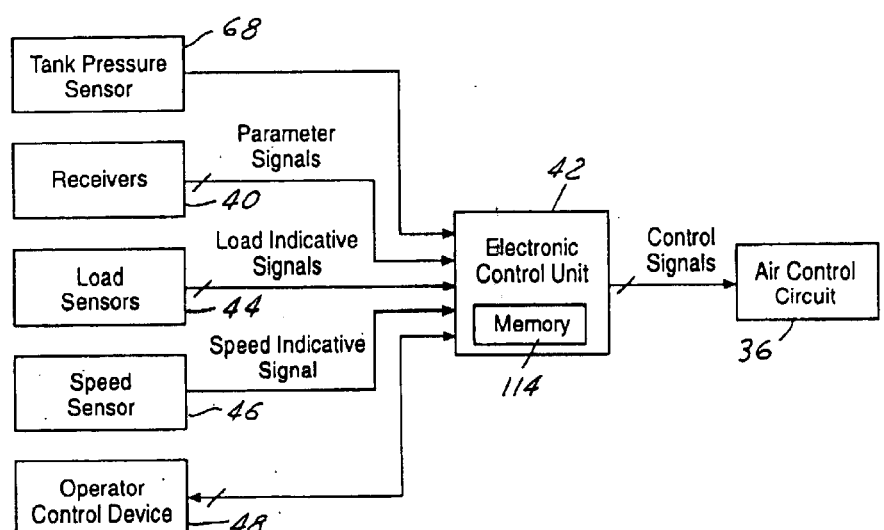
FIG. 3 is a schematic view of components of the system of FIG. 1.

Referring to FIG. 3, electronic control unit 42 controls fluid control circuit 36. Control unit 42 may include a microprocessor operating under the, control of a set of programming instructions commonly referred to as software. Electronic control unit 42 may include a memory 114 in which the programming instructions are stored. Memory 114 also may contain identification codes for each tire 28 of vehicle 12 to uniquely identify the particular tire 28 to which a particular parameter signal corresponds. Memory 114 also may be used to record tire pressure values or user inputs over a period of time to assist in evaluating tire pressure management.

Control unit 42 may receive input signals from central presser sensor 200, one or more load sensors 44, speed sensor 46, and operator control device 48. Control unit 42 outputs a plurality of control signals to control valves 82, 84, 86, 88, 90 of fluid control circuit 36 and solenoid valve 72 of vacuum source 34. Control unit 42 also may generate a plurality of output signals to a display device which may include a part of operator control device 48 or a freestanding device. The latter signals may be used to trigger the display pressure readings and/or deflection levels for each vehicle tire 28, the load on vehicle 12 or a portion of it, and the speed of vehicle 12. The signals may also be used to trigger warnings to the operator of vehicle 12 in the event that pressure cannot be maintained in one of the vehicle tires 28, the pressure exceeds or falls below predetermined maximum and minimum tire pressure values, or the pressure differs from a target pressure value by more than a predetermined amount.

In operation, to be able to sense pressure in any of tires 28, the conduit assemblies for conducting fluid to or from tires 28 in which sensor 200 is disposed must be in equilibrium with tires 28. To bring the pressure in the conduit assemblies and tires 28 into substantial equilibrium, valve assembly 30 must open to permit the fluid communication needed for conduit assemblies and tires 28. As described above, valve assembly 30 closes when pressure in the conduit a assemblies is neutral or at equilibrium with the pressure in tires 28. Thus, to obtain a pressure in the conduit assemblies equivalent to the pressure in tires 28, control unit 42 must instruct system 10 to provide compressed fluid to the conduit assemblies which is sufficient to open valve assembly 30. In practice, such pulse will increase the pressure in tire 28. However, as described below, because cyclical monitoring of tires 28 can lead to overinflation, such pressure should be minimized.

Load sensors 44 provide an indication as to the load on vehicle 12 and, consequently, tires 28 of vehicle 12, or the load on some portion of vehicle 12 and, consequently, select tires 28 of vehicle 12. Load sensors 44 are conventional and load sensing may be provided in a variety of known ways, including through analysis of pneumatic pressure in the suspension of vehicle 12, analysis of powertrain parameters, the use of displacement transducers, or the implementation of load beams and strain gauges. Each load sensor 44 may provide one or more signals to electronic control unit 42 indicative of the load bearing on vehicle 12 or a portion thereof.

Electronic control unit 42 may initiate pressure adjustment in tires 28 of vehicle 12 in response to signals from load sensors 44 in a variety of ways. For example, electronic control unit may cause an increase or decrease in the pressure in one or more tires 28 responsive to a corresponding increase or decrease in vehicle load based on a variety of linear or non-linear functions. One or more tire deflection tables may be stored in a memory, such as memory 114, and accessed by electronic control unit 42 responsive to the signals from load sensors 44.

Speed sensor 46 measures the speed of vehicle 12 to further control deflection levels for tires 28. High deflection levels can create safety concerns and reduce tire life if maintained while vehicle 12 is operating at relatively high speeds. Speed sensor 46 is conventional and provides a signal to electronic control unit 42 corresponding to speed.

Operator control device 48 may allow the operator, of vehicle 12 to exert at least some level of control over system 10. Device 48 is conventional and may include a plurality of input/output devices, such as a keypad, touch screen, switches or similar input devices, and a display screen, sound generator, lights or similar output devices. Thus, device 48 permits an operator of vehicle 12 to transmit control signals to electronic control unit 42 to adjust pressure levels within the tires 28 of vehicle 12. The control signals may, for example, correspond to deflection levels for tires 28 of vehicle 12. As a result, the operator is able to adjust the deflection level of the tires 28 to correspond to the terrain over which vehicle 12 is traveling. Such control is desirable to provide improved floatation and traction on certain terrain.

The sequencing and interaction of components of system 10 may be appreciated more readily in the context of the following description of the present method.

Figure 4:
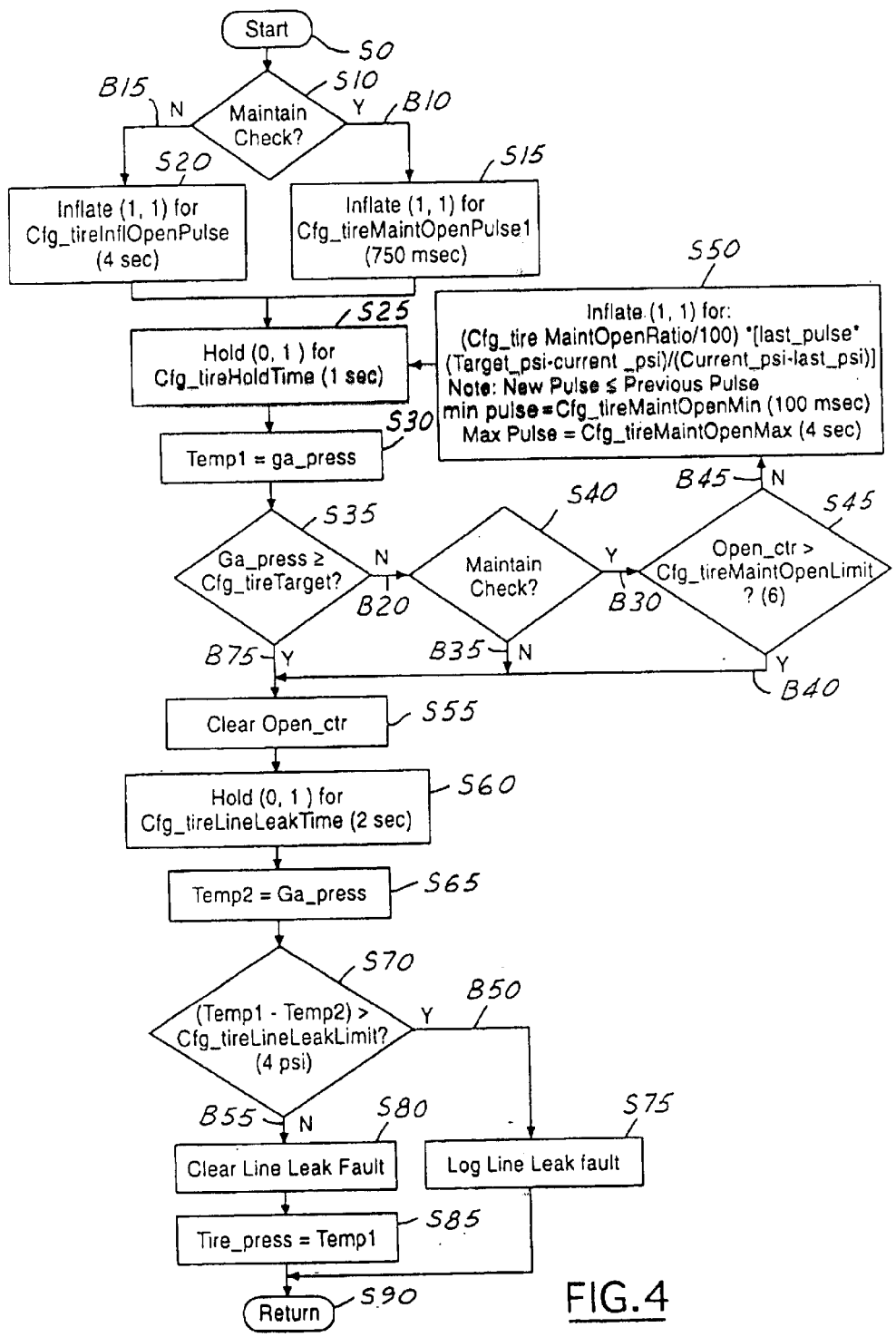
FIG. 4 is a schematic view of a flow chart for a method configured according to the invention.

FIG. 4 shows a flow chart of the present method. The method may be called during the execution of a master tire pressure maintenance program (not shown). For example, control unit 42 may pass control to step S0 if a routine of the master tire pressure maintenance program instructs control unit 42 to measure or ascertain the current tire pressure of at least one of tires 28. Control unit 42 then passes control to step S10.

At step S10, the invention provides for determining whether system 10 is maintaining or monitoring tire pressure. During tire pressure maintenance, tire pressure is adjusted; during tire pressure monitoring, tire pressure is not adjusted, only ascertained. As described above, control unit 42 ascertains the pressure of at least one of tires with central sensor 200. Ascertaining pressure in any of tires 28 with central sensor 200 requires increasing the pressure of the conduit assemblies for conducting fluid to or from tires 28 in an amount sufficient to open the appropriate valve assembly 30, initiating fluid communication and attaining equilibrium among the conduit assemblies and the target tire 28. If maintaining pressure is occurring, pressure in tire 28 is low, therefore adding fluid, hence increasing pressure of, tire 28 is of minimal concern. However, if only monitoring pressure is occurring, adding fluid may cause overinflation because tire inflation management systems typically cycle through pressure monitoring routines regularly, thus any addition of fluid to tires 28 from which would eventually increase the pressure in tires 28 beyond a target pressure. Accordingly, if control unit 42 does not detect the existence of a maintenance flag, which may have been set during execution of the master tire pressure maintenance program, control unit 42 may instruct pertinent components of system 10 to direct a large pulse of compressed fluid into the conduit assemblies which is likely to open valve assemblies 30 and increase the pressure thereof slightly. To this end, control unit 42 passes control along branch B15 to step S20, described below. If control unit 42 detects a maintenance flag, the invention provides for pressurizing the conduit assemblies incrementally to bring the conduit assemblies up to or slightly over the target pressure, causing the valve assembly 30 associated with a tire 28 having a lower pressure to open and permit attainment of equilibrium among the conduit assemblies and the tire 28. To that end, control unit 42 passes control along branch B10 to step S15.

At step S15, the invention provides for pressurizing the conduit assemblies with a short pulse of compressed fluid. Control unit 42 instructs solenoid 82 and any of solenoids 86, 88 and/or 90 to open, and solenoid 84 to close, as described above, for a relatively brief duration, such as 750 msec, thereby forming a small pulse of compressed fluid. This pulse is configured to pressurize the conduit assemblies in an amount that is not sufficient to open a valve assembly 30, thereby restrict fluid from entering or overinflating a tire 28. The duration may be set by the manufacturer in an amount deemed appropriate. Control unit 42 then passes control to step S25, described below.

At step S20, the invention provides for supplying a large pulse of compressed fluid to the conduit assemblies. Control unit 42 instructs solenoid 82, and any of solenoids 86, 88 and/or 90 to open, and solenoid 84 to close, as described above, for a relatively long duration, such as 4 sec, thereby forming a large pulse of compressed fluid. Unlike in step S15, this pulse is configured to pressurize the conduit assemblies in an amount that is sufficient to open a valve assembly 30, thereby promote fluid communication and subsequent equilibrium among the conduit assemblies and tire 28. Subsequent pressure measurement at the manifold would yield a pressure corresponding to the current pressure in tires 28. The duration of the large pulse may be set by the manufacturer in an amount deemed appropriate. Thereafter, control unit 42 passes control to step S25.

At step S25, the invention provides for pausing for a first pause duration. The first pause duration extends as long as needed to attain pressure stabilization, for measuring static pressure, of the fluid in the conduit assemblies. Control unit 42 instructs solenoid 82 to close while leaving open solenoids 86, 88 and/or 90. Control unit 42 then passes control to step S30.

At step S30, the invention provides for measuring the current gage pressure in the conduit assemblies and saving same as a variable "temp1." Control unit 42 then passes control to step S35.

At step S35, the invention provides for determining whether the current tire pressure, or measured gage pressure in the conduit assemblies, equals or exceeds an operator-configured, or operator designated, target tire pressure. If the measured gage pressure equals or exceeds the target pressure, no further tire pressure adjustment is required, therefore control passes onto line leak checking routines. Accordingly, if "temp1" exceeds the target tire pressure, control unit 42 passes control along branch B25 to step S55, described below. If "temp1" does not exceed the target tire pressure, control unit 42 passes control along branch B20 to step S40.

Step S40 is similar to step S10, described above, therefore is described no further. If the maintenance flag is set, control unit 42 passes control along branch B30 to step S45, described below. If the maintenance flag is not set, control unit 42 passes control along branch B35, to branch B40 and thereafter to step S55, described below.

At step S45, the invention provides for incrementing a counter then determining whether the value of the counter exceeds a manufacturer-configured, or manufacturer designated, limit. If control unit 42 repeatedly increases conduit assembly pressure in incremental amounts more than, for example, six times, control unit 42 operates under the assumption that the pressure in tires 28 is below the target pressure and require inflation. Thus, if the counter value exceeds the limit, control unit 42 passes control along branch 340 to step S55, described below. If the counter value does not exceed the limit, control unit 42 passes control along branch B45 to step S50.

At step S50, the invention provides for providing a pulse of compressed fluid, having a proportioned pulse duration, to tires 28. The pulse duration is the amount of time that solenoids 82 and solenoids 86, 88 and/or 90 are open, and solenoid 84 is closed, to provide fluid communication between source 32 and tires 28. The pulse duration is proportioned according to the current pressure shortfall with respect to the target pressure divided by the pressure increase realized from the last pulse of compressed fluid introduced into the conduit assemblies. Pulse duration is calculated according to:

$$D_1 = n * D_0 * [(P_T - \text{temp1})/(\text{temp1} - P_L)]$$

where $D_1$ is the pulse duration for the next pulse; n is a manufacturer-configurable, or manufacturer designated, adjustment factor for fine tuning, the pulse duration in consideration of characteristics of the tire maintenance system, if necessary; $D_0$ is the pulse duration of the last pulse of compressed fluid introduced into the conduit assemblies, such as at steps S15 or S50; $P_T$ is the target pressure; temp1 is the current gage pressure measured; and $P_L$ is the pressure measured during the last execution of the routine. The pulse duration is based on a previous a pulse duration employed to closed the gap between the measured current gage pressure, measured at step S30, and the target pressure. Because the gap following the previous pulse should be smaller, the duration of a subsequent pulse is reduced correspondingly. Thus, pulse duration is diminished by a fraction, or ratio, wherein the dividend is the target pressure less the current measured gage pressure and the divisor is the current measured gage pressure less the pressure measured during the last execution of the routine. As the current and target pressures approach equality, the pulse duration diminishes correspondingly. Pulses of compressed fluid having a pulse duration as calculated above will bring conduit assembly pressure up to, but not over the target pressure. Thus, during monitoring, no fluid is added to tires 28, avoiding overinflation of same. Control unit 42 then passes control to step S25, described above.

At step S55, the invention provides for clearing the counter described with respect to step S45. Control unit 42 then passes control to step S60.

At step S60, the invention provides for pausing for a second pause duration. The second pause duration extends as long as needed to determine whether line leaks exist in the conduit assemblies. Thus, the second pause duration is long enough to allow an amount of fluid to escape from the conduit assemblies if a line leak exists therein. Similar to step S25, control unit 42 instructs solenoid 82 to close while leaving open solenoids 86, 88 and/or 90. Control unit 42 then passes control to step S65.

At step S65, the invention provides for measuring the post-adjustment gage pressure in the conduit assemblies and saving same as a variable "temp2." Control unit 42 then passes control to step S70.

At step S70, the invention provides for determining whether the difference between the pressure measured after the first, brief settling period, at step S25, and the second, extended stabilization period, at step S60, exceeds a manufacturer-configured, or manufacturer designated, limit. The limit represents an amount deemed symptomatic of a line leak. When the difference between "temp1" and "temp2" does not exceed the limit, control unit 42 passes control along branch B55 to step S80, described below. When the difference exceeds the limit, control unit 42 passes control along branch B50 to step S75.

At step S75, the invention provides for logging a line leak fault. Control unit 42 then passes control to step S90, described below.

At step S80, the invention provides for clearing a line leak fault which may have been logged at step S75, for example, during a previous execution of the present method. Control unit 42 then passes control to step S85.

At step S85, the invention provides for saving the measured gage pressure "temp1" as the current pressure $P_L$. This accommodates the possibility that tires 28 are below the target pressure. Thus, the invention provides for setting the target pressure to the pressure that exists in the conduit assemblies. Control unit 42 then passes control to step S90.

At step S90, the invention provides for returning control to the main tire pressure maintenance program (not shown). Thereafter control unit 42 may initiate an inflation routine (not shown) to bring the pressure of tires 28 up to the target pressure.

While the invention has been particularly shown and described with reference to the preferred embodiment thereof, it is well understood by those skilled that various changes and modifications can be made in the invention without departing from the spirit and scope of the invention.

We claim:

1. A method of determining a tire pressure in a vehicle tire comprising the steps of:

ascertaining a first fluid pressure in a conduit disposed between a fluid source and said tire using a sensor disposed in said conduit;

comparing said first fluid pressure to a target pressure;

providing a pulse of compressed fluid to said conduit when said first fluid pressure is less than said target pressure, said pulse having a duration determined responsive to a duration of a previous pulse of compressed fluid provided to said conduit and a change in pressure in said conduit resulting from said previous pulse; and, repeating said ascertaining, comparing, and providing steps until said first fluid pressure in said conduit reaches said target pressure.

2. The method of claim 1 wherein said first fluid pressure is ascertained following a predetermined hold time that begins after said previous pulse is provided to said conduit.

3. The method of claim 1 wherein said duration of said previous pulse is a preset period.

4. The method of claim 1 wherein said duration of said pulse is determined in accordance with the following formula:

$$D_1 = n * D_0 * [(P_T - \text{temp}_1)/(\text{temp}1 - P_L)]$$

wherein n is a predetermined value, $D_0$ is said duration of said previous pulse, $P_T$ is said target pressure, temp1 is said first fluid pressure and $P_L$ is a previous fluid pressure in said conduit resulting from said previous pulse.

5. The method of claim 1 further comprising the steps of:

determining a second fluid pressure in said conduit following a predetermined line leak hold time; and, comparing said first and second fluid pressures.

6. The method of claim 5 wherein said tire pressure equals said first fluid pressure if a difference between said first and second fluid pressures is less than a predetermined amount.

7. The method of claim 5 further comprising the step of logging a line leak fault if a difference between said first and second fluid pressures is greater than a predetermined amount.

8. A method of determining a tire pressure in a vehicle tire comprising the steps of:

ascertaining a first fluid pressure in a conduit disposed between a fluid source and said tire using a sensor disposed in said conduit;

comparing said first fluid pressure to a target pressure;

incrementing a counter when said first fluid pressure is less than said target pressure;

comparing said counter to a predetermined value;

providing a pulse of compressed fluid to said conduit when said first fluid pressure is less than said target pressure and said counter is less than said predetermined value, said pulse having a duration determined responsive to a duration of a previous pulse of compressed fluid provided to said conduit and a change in pressure in said conduit resulting from said previous pulse; and, repeating said ascertaining, comparing, and providing steps until said first fluid pressure in said conduit reaches said target pressure or said counter reaches said predetermined values.

9. The method of claim 8 wherein said first fluid pressure is ascertained following a predetermined hold time that begins after said previous pulse is provided to said conduit.

10. The method of claim 8 wherein said duration of said previous pulse is a preset period.

11. The method of claim 8 wherein said duration of said pulse is determined in accordance with the following formula:

$$D_1 = n * D_0 * [(P_T - \text{temp}1)/(\text{temp}1 - P_L)]$$

wherein n is a predetermined value, $D_0$ is said duration of said previous pulse, $P_T$ is said target pressure, temp1 is said first fluid pressure and $P_L$ is a previous fluid pressure in said conduit resulting from said previous pulse.

12. The method of claim 8, further comprising the steps of:

determining a second fluid pressure in said conduit following a predetermined line leak hold time; and, comparing said first and second fluid pressures.

13. The method of claim 12 wherein said tire pressure equals said first fluid pressure if a difference between said first and second fluid pressures is less than a predetermined amount.

14. The method of claim 12 further comprising the step of logging a line leak fault if a difference between said first and second fluid pressures is greater than a predetermined amount.

* * * * *

UNITED STATES PATENT AND TRADEMARK OFFICE
CERTIFICATE OF CORRECTION

PATENT NO. : 6,868,719 B1
DATED : March 22, 2005
INVENTOR(S) : Stephen P. Claussen and Daryl J. Stacer It is certified that error appears in the above-identified patent and that said Letters Patent is hereby corrected as shown below:

<u>Column 10,</u>
Line 14, replace "values" with -- value --.

Signed and Sealed this

Thirty-first Day of May, 2005

JON W. DUDAS
*Director of the United States Patent and Trademark Office*